(12) United States Patent
Sotomura et al.

(10) Patent No.: US 6,596,431 B1
(45) Date of Patent: Jul. 22, 2003

(54) BATTERY AND METHOD FOR GENERATING AN ELECTRIC POWER

(75) Inventors: Tadashi Sotomura, Kashiwara (JP); Isao Taniguchi, Kumamoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 59 days.

(21) Appl. No.: 09/759,317

(22) Filed: Jan. 16, 2001

(30) Foreign Application Priority Data

Jan. 20, 2000 (JP) .................................... 2000-011428
Jan. 20, 2000 (JP) .................................... 2000-011429

(51) Int. Cl.⁷ ............................................... H01M 4/60
(52) U.S. Cl. ......................................... 429/50; 429/213
(58) Field of Search ........................... 429/50, 105, 213

(56) References Cited

U.S. PATENT DOCUMENTS

| 3,701,687 A | | 10/1972 | Grubb et al. | |
| 3,941,135 A | * | 3/1976 | von Sturm et al. | 429/231 X |
| 4,224,125 A | | 9/1980 | Nakamura et al. | |
| 4,294,891 A | | 10/1981 | Yao et al. | |
| 4,578,323 A | | 3/1986 | Hertl et al. | 429/15 |
| 4,740,437 A | * | 4/1988 | Fujii et al. | 429/213 |

FOREIGN PATENT DOCUMENTS

| DE | 195 19 123 | * | 1/1996 | H01M/14/00 |
| DE | 196 48 691 | * | 7/1997 | H01M/14/00 |
| EP | 0 219 806 | | 4/1987 | |
| GB | 1252186 | | 11/1971 | |
| IT | 1147446 | | 11/1986 | |
| JP | 63-143749 | | 6/1988 | |
| JP | 02-253566 | | 10/1990 | |
| JP | 11-214020 | | 8/1999 | |
| WO | WO 97/17828 | | 5/1997 | |

OTHER PUBLICATIONS

"Essential Cell Biology", B. Alberts et al., Garland Publishing, Inc. (1997), p. 107 (Month N/A).

* cited by examiner

*Primary Examiner*—Stephen Kalafut
(74) *Attorney, Agent, or Firm*—McDermott, Will & Emery

(57) ABSTRACT

For utilizing the chemical energy of a sugar directly as electric energy, electrolytic oxidation of a sugar on the negative electrode associated with cleavage of a carbon-carbon bond thereof is employed, thereby generating an electromotive force between the positive electrode and the negative electrode having an electrolyte therebetween. For an efficient oxidation of a sugar, it is effective for the negative electrode to have a component capable of forming a coordination compound with a sugar via a hydroxyl group thereof. Such a component may comprise a metal element capable of forming an amphoteric hydroxide. Use of an oxygen electrode as the positive electrode gives a battery capable of efficiently converting the chemical energy of a sugar into electric energy.

7 Claims, 6 Drawing Sheets

F I G. 5
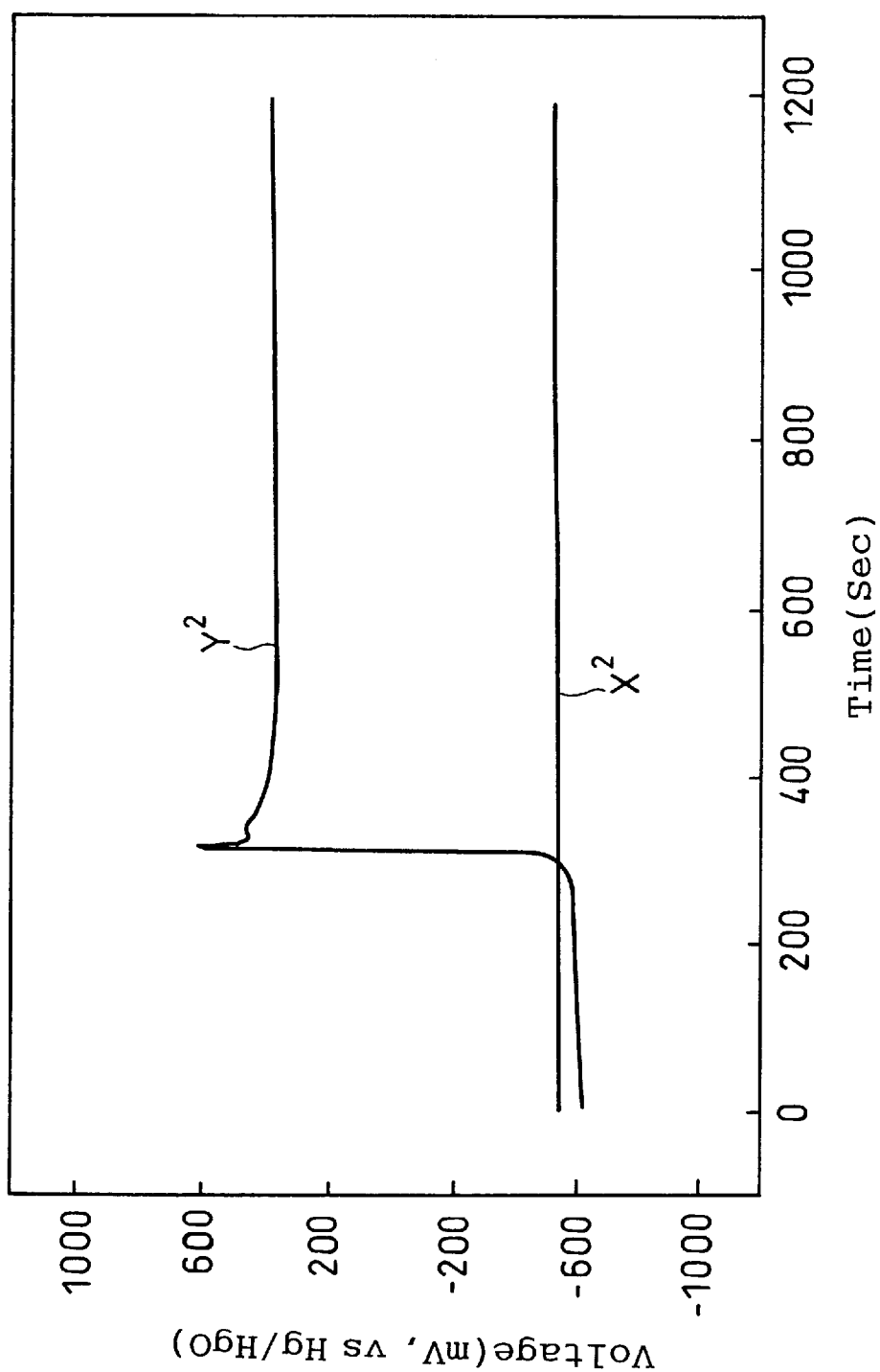

ially in the appended claims, the invention, both as to
BATTERY AND METHOD FOR GENERATING AN ELECTRIC POWER

BACKGROUND OF THE INVENTION

The present invention relates to a method for generating an electric power and a battery utilizing a sugar as a source of energy.

Like protein and lipid, sugar is an important energy source for animals. Glucose represented by the chemical formula: $C_6H_{12}O_6$ is a typical example of a sugar. When one glucose molecule is completely oxidized, 24 electrons are taken out of it, and carbon dioxide and water are produced. These 24 electrons are utilized as energy in the body of any animal. According to the thermodynamic calculation, glucose has an energy of 2872 kJ per mol or 4.43 Wh per gram. This energy density is higher than 3.8 Wh/g, which is the weight energy density of metallic lithium used for the negative electrode of a lithium battery known to have a high energy density.

However, the methods of utilizing the energy of sugar, have not been developed so far except methods utilizing it as heat energy source through combustion thereof in air or as chemical energy source used for ATP or the like through the action of 10 or more oxidases in an animal body (see Alberts et al., Essential Cell Biology, Garland Publishing, Inc. 1997, p107). Specifically, no method have been produced of effectively utilizing the chemical energy of sugar directly as electric energy.

BRIEF SUMMARY OF THE INVENTION

In view of the foregoing circumstances, it is an object of the present invention to provide a method for generating an electric power, which allows efficient utilization of a sugar as an energy source.

It is another object of the present invention to provide a battery, which allows efficient utilization of the chemical energy of a sugar directly as an electric energy.

The present invention is directed to a method for generating an electric power by generating an electromotive force between a positive electrode and a negative electrode with an electrolyte intervening therebetween, comprising a process of electrolytic oxidation of a sugar on the negative electrode, the oxidation being associated with cleavage of at least one carbon-carbon bond of the sugar.

Preferably, the electrolytic oxidation comprises a step of forming a coordination compound comprising the sugar.

The negative electrode preferably has a component capable of forming a coordination compound with the sugar via a hydroxyl group thereof.

The above component is preferably carried on a conductive substrate which constitutes the negative electrode.

It is preferable that the above component comprises a metal element capable of forming an amphoteric hydroxide.

It is also preferable that the metal element is at least one selected from the group consisting of Mg, Ti, V, Ni, Cu, Zn, Zr, Ag, In, Sn, Sb, and Pb.

It is further preferable that the above component comprises at least one selected from the group consisting of lead oxide, lead hydroxide, and basic lead carbonate.

The conductive substrate constituting the negative electrode preferably comprises a metallic lead or a lead alloy.

The conductive substrate further preferably comprises a lead alloy which contains at least one selected from the group consisting of Mg, Ti, In, Sn, and Sb.

The present invention is also directed to a battery comprising a positive electrode, a negative electrode, an electrolyte intervening between the positive electrode and the negative electrode, and a sugar to be supplied to the negative electrode. In this battery, the negative electrode is capable of promoting an electrolytic oxidation of the sugar thereon to generate an electromotive force between the positive electrode and the negative electrode, the electrolytic oxidation being associated with cleavage of at least one carbon-carbon bond of the sugar.

It is preferable that, in the battery, the negative electrode has a component capable of forming a coordination compound with a sugar via a hydroxyl group thereof. Herein, the component is preferably carried on a conductive substrate constituting the negative electrode.

In the battery, the component preferably comprises at least one selected from the group consisting of lead oxide, lead hydroxide, and basic lead carbonate. Further, the conductive substrate constituting the negative electrode preferably comprises a metallic lead or a lead alloy.

It is preferable that, in the battery, the positive electrode is capable of promoting an electrolytic reduction at a higher electric potential than the electrolytic oxidation on the negative electrode.

The positive electrode is preferably an oxygen electrode capable of reducing oxygen.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 5 is a graph showing relations between time and potential exhibited by a test electrode in one example of the present invention.

DETAILED DESCRIPTION OF THE INVENTION

Figure 1:
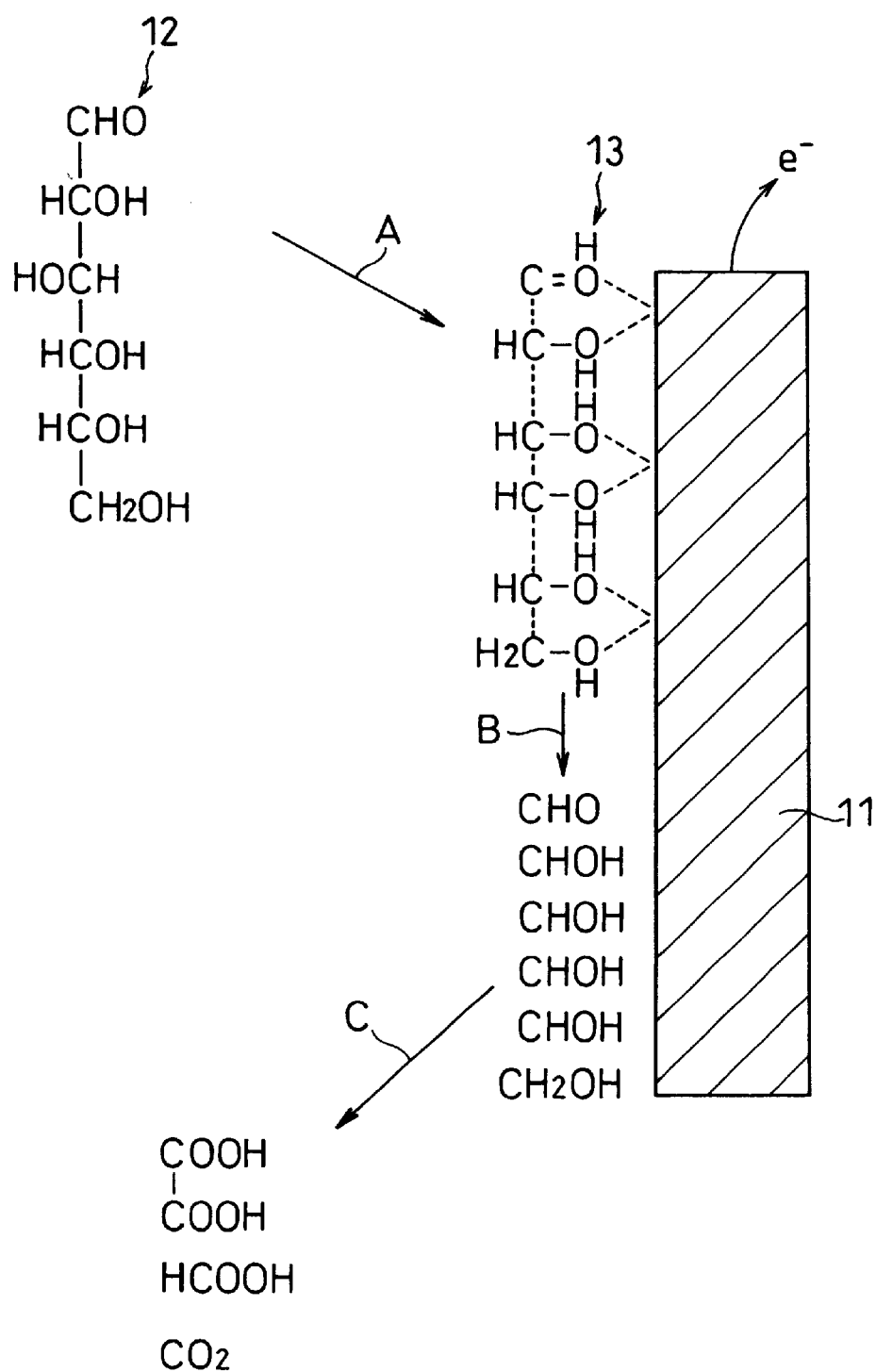
FIG. 1 is a schematic view illustrating a process of electrochemical oxidation of a sugar in one mode of the present invention.

A method of the present invention employs a negative electrode which is suitable for electrolytic oxidation of a sugar associated with cleavage of a carbon-carbon bond, i.e. C—C bond, of a sugar molecule. When a sugar is supplied to a battery manufactured by combining this negative electrode with a positive electrode and an electrolyte, an electromotive force is generated between the negative electrode causing the electrolytic oxidation of a sugar and the positive electrode. This means that it is possible to utilize the chemical energy stored in the form of C—C bond in sugar molecules directly as electric energy. As the number of cleaving C—C bonds increases, the number of electrons participating in the oxidation reaction increases and, hence, the amount of utilizable energy increases.

Examples of sugars to be used in the present invention include, without any particular limitation, carbohydrates like monosaccharides and initial productions obtained from decomposition thereof such as glucose, mannose, galactose, fructose, glyceraldehyde, dihydroxyacetone, erythrose, ribulose, xylulose, sedoheptulose, ribose, deoxyribose, sorbose, glucosamine, and galactosamine; disaccharides such as isomaltose, maltose, cellobiose, lactose, raffinose, and sucrose; oligosaccharides; and polysaccharides such as starch, glycogen, cellulose, glycoprotein, glycosaminoglycan, and glycolipid. Among them are preferable glucose, mannose, galactose, and fructose in terms of their high current efficiency in the electrolytic oxidation on the negative electrode. Particularly are preferable glucose, mannose, and galactose in terms of the current efficiency.

It is preferable that the electrolytic oxidation of a sugar comprises the step of forming a coordination compound, i.e. complex, comprising a sugar and a component capable of forming the coordination compound with the sugar via a hydroxyl group thereof. In this step, a primary chemical bond is formed between the hydroxyl group of the sugar and the component. Electrons transfer from the sugar to the component through the primary chemical bond. This transfer of electrons weakens the C—C bond and finally causes cleavage thereof. In this way, the C—C bond of a sugar can effectively be weakened by forming a coordination compound comprising the sugar with its hydroxyl group, which is bonded to the carbon atom forming the C—C bond, used as a coordinating group. Thus, it is possible to cause cleavage of C—C bond electrochemically by oxidation with lower activation energy. Further, since the potential at which a sugar is oxidized lowers, a battery having the electrode causing electrolytic oxidation of a sugar as the negative electrode and a counter electrode as the positive electrode can generate a larger electromotive force.

The "coordination compound" termed herein means an intermediate complex formed between the reactants in the process of a chemical reaction where the reactants are turned into a desired product. Such intermediate complexes include mononuclear complex and binuclear complex formed by coordination of a single or plural ligands with a single or plural central atoms.

The formation of the coordination compound may occur either at the electrode/electrolyte interface or in the electrolyte. In the case where the formation of the coordination compound occurs in the electrolyte, by providing a current collecting material to be brought into contact with the coordination compound in the electrolyte, it become possible to take electrons out of the coordination compound through the current collecting material. However, the component capable of forming a coordination compound with sugar via a hydroxyl group thereof is preferably deposited on the negative electrode.

When the component capable of forming a coordination compound with sugar via a hydroxyl group thereof is deposited on the negative electrode, as indicated by arrow A in FIG. 1, a sugar 12 comes closer to the negative electrode 11 with its hydroxyl groups turning to the electrode 11 so that a coordination compound 13 comprising the component deposited on the negative electrode 11 and sugar 12 is formed at the negative electrode 11/electrolyte interface in a high density. Electrons transfer from the coordination compound 13 to the negative electrode 11 and then to any outside circuit, thereby causing cleavage of C—C bonds of the sugar 12.

Arrow B indicates the process of such cleavage. In the end, the sugar 12 is oxidized into oxalic acid, formic acid, carbon dioxide or the like. Arrow C indicates the process of this oxidation. As the concentration of sugar participating in the reaction at the negative electrode/electrolyte interface increases, transfer of electrons from the coordination compound to the negative electrode is allowed more easily and, hence, an oxidation current density also increases.

Preferably, the component capable of forming a coordination compound with a sugar via a hydroxyl group thereof comprises a metal element capable of forming an amphoteric hydroxide. Such a metal element serves to lower the activation energy for the oxidation reaction of a sugar by virtue of its high affinity with a hydroxyl group, hence to lower the electric potential at which the oxidation of a sugar proceeds, whereby an increased electromotive force can be obtained.

Preferable examples of the metal element capable of forming an amphoteric hydroxide are Mg, Ti, V, Ni, Cu, Zn, Zr, Ag, In, Sn, Sb, and Pb in terms of their ability to form an amphoteric hydroxide. Among them, Pb is particularly preferred.

Examples of the component capable of forming a coordination compound with a sugar via a hydroxyl group thereof include cation, simple substance, alloy, oxide, hydroxide, basic carbonate, sulfate, nitrate, sulfide, fluoride, chloride, iodide, and porphyrin complex such as iron-porphyrin or zinc-porphyrin, of the metal element capable of forming an amphoteric hydroxide. These may be used either alone or in combination of two or more of them.

The above specific components may be used in combination with a compound capable of forming a hydrogen bond via a hydrogen atom of a hydroxyl group, like an amino acid such as glycine or alanine, an alkylammonium such as tetramethylammonium or tetrabutylammonium; an alkylpyridinium such as 4-ethylpyridinium or 2-butylpyridinium; an alcohol such as amyl alcohol or glycerin; a thiol such as dithiobisalkylamine, thiocyanuric acid or bismuthiol; or compounds having primary amino group, secondary amino group, tertiary amino group, quaternary amino group, ammonium group, pyridinium group, alcohol group or thiol group.

The component capable of forming a coordination compound with a sugar via a hydroxyl group thereof preferably contains Pb. Examples of such components include a metallic lead, a lead alloy such as Pb—Sn, Pb—In, Pb—Mg, Pb—Ag, Pb—Sb or Pb—Sb—Sn, and a compound of lead such as PbO, $PbO_2$, $Pb_3O_4$, $PbCO_3$, $Pb(OH)_2$, $(PbCO_3)_2.Pb(OH)_2$. $PbSO_4$, PbS, $PbF_2$, $PbCl_2$, $PbI_2$, $Pb(NO_3)_2$, $PbTiO_3$, $PbZrO_3$ or $Pb(Ti, Zr)O_3$. Particularly preferable among them are a lead oxide such as PbO, $PbO_2$ or $Pb_3O_4$, a lead hydroxide such as $Pb(OH)_2$, and a basic lead carbonate such as $(PbCO_3)_2.Pb(OH)_2$, or mixtures thereof. Use of any one of these compounds allows electrolytic oxidation of a sugar to occur at a potential of minus 0.6 V or lower relative to an Hg/HgO standard electrode, thereby providing a battery with a large electromotive force.

The component containing Pb preferably further contains at least one element selected from the group consisting of Mg, Ti, In, Sn and Sb. Such a component facilitates oxidation of a sugar, so that the potential at which the oxidation of a sugar proceeds further shifts toward a lower side.

An electrode comprising a conductive substrate and a lead oxide such as PbO, $PbO_2$ or $Pb_3O_4$, a lead hydroxide such as $Pb(OH)_2$, a basic lead carbonate such as $(PbCO_3)_2 \cdot Pb(OH)_2$, or a mixture thereof carried thereon can be manufactured easily by subjecting a substrate of lead or lead alloy to electrolysis in an alkaline electrolyte. Specifically, such electrolysis is performed using the substrate of lead or lead alloy as a working electrode and a counter electrode of platinum or the like, at an appropriate potential where the potential of the working electrode is between minus 1.2 V and plus 0.8 V relative to the Hg/HgO standard electrode.

When the potential of the working electrode is in a zone proximate to plus 0.8 V in the electrolysis, a mixture of lead compounds rich in $PbO_2$ and $Pb_3O_4$ can be deposited on the surface of the substrate. When the electrolysis is performed in the presence of carbon dioxide gas with the potential of the working electrode within a zone between minus 1.2 V and 0 V, a mixture of lead compounds rich in basic carbonate can be deposited on the surface of the substrate. If the electrolyte contains iodide ions, fluoride ions, chloride ions or sulfate ions, lead compounds containing $PbF_2$, $PbCl_2$, $PbI_2$ or $PbSO_4$ can be deposited on the surface of the substrate.

Methods for depositing lead compounds on the substrate are not limited to the above electrolytic methods in the electrolyte. The deposition of lead compounds on the substrate may be achieved by dipping a conductive substrate into a solution containing desired lead compounds and then drying the substrate wet with the solution to remove the solvent. After removal of the solvent, the substrate may be calcined in an oxygen atmosphere. Alternatively, such lead compounds may be deposited on the conductive substrate by chemical vapor deposition (CVD), physical vapor deposition (PVD), sputtering, ion plating, or a like process.

For the conductive substrate may be used metallic materials such as gold, platinum, tin, copper, silver, lead, iron, and an alloy thereof, and stainless steel; conductive polymers such as polyaniline, polythiophene, and polyacetylene; conductive metal oxides such as ITO (indium-tin oxide); and carbon materials such as artificial graphite and natural graphite. Among them, lead and lead alloy are preferable.

A substrate of lead or lead alloy has an advantage that lead compounds can be deposited thereon easily by electrolysis. Further, in the case where a portion of the substrate is turned into lead compounds, such lead compounds can firmly be carried on the substrate by chemical bond. Another advantage is that the composition of the mixture of lead compounds can be varied as desired by varying the potential for the electrolysis and the formulation of the electrolyte. Particularly preferable among lead alloys are those containing at least one element selected from the group consisting of Mg, Ti, In, Sn and Sb.

When sugar is supplied to the negative electrode of a battery constructed using the electrode suitable for the electrolytic oxidation of a sugar, a positive electrode and an electrolyte intervening between these electrodes, the electrolytic oxidation of the sugar associated with cleavage of at least one C—C bond occurs on the negative electrode, thereby generating an electromotive force between the negative and positive electrodes.

The reaction on the positive electrode is a reduction reaction which occurs at a potential higher than the potential at which the electrolytic oxidation of a sugar proceeds on the negative electrode. Such a reduction reaction may be any reduction reaction which allows electrons taken out of a sugar molecule to be received by the positive electrode via outside load.

Examples of such a reaction on the positive electrode include a reduction reaction of water or oxygen, a reduction reaction of a hydroxide or oxide such as NiOOH, MnOOH, $Pb(OH)_2$, PbO, $MnO_2$, $Ag_2O$, $LiCoO_2$, $LiMn_2O_4$ or $LiNiO_2$, a reduction reaction of a sulfide such as $TiS_2$, $MOS_2$, FeS or $Ag_2S$, a reduction reaction of a metal halide such as AgI, $PbI_2$ or $CuCl_2$, a reduction reaction of an organic compound containing sulfur such as a quinone or an organic disulfide compound, and a reduction reaction of a conductive polymer such as polyaniline or polythiophene.

The positive electrode is particularly preferably an oxygen electrode for causing reduction of oxygen. In this case, a gas containing oxygen can be used as a positive electrode active material and, hence, storage of such a positive electrode active material within the battery is unnecessary, whereby a battery having a high energy density can be fabricated.

Any oxygen electrode can serve as the positive electrode so long as it contains a substance having an ability to reduce oxygen. Examples of such a substance include activated carbon, manganese oxide in a low oxidation state such a $Mn_2O_3$, platinum, palladium, iridium oxide, ammine complex of platinum, phenylenediamine complex of cobalt, metal porphyrin complex having cobalt, manganese, zinc, magnesium or the like, and perovskite oxide such as $La(Ca)CoO_3$ or $La(Sr)MnO_3$.

Any electrolyte can be used so long as it allows transfer of anion and/or cation between the positive electrode and the negative electrode and it ensures continuous oxidation-reduction reaction on the positive and negative electrodes. Therefore, any such substance may be used as the electrolyte irrespective of whether it is organic or inorganic and whether it is liquid or solid.

Examples of specific electrolytes include an aqueous solution of a metal salt such as $ZnCl_2$ or $NH_4Cl$, an aqueous solution of an alkali such as KOH or NaOH, an aqueous solution of an acid such as $H_3PO_4$ or $H_2SO_4$, a solution of a metal salt such as $LiBF_4$ or $LiPF_6$ dissolved in a mixed organic solvent of propylene carbonate and ethylene carbonate, an ion-exchange membrane made of a polymer material such as a fluorocarbon polymer having a sulfonic acid group, amide group, ammonium group or pyridinium, group, and a polymer electrolyte, such as polypropylene oxide or polyethylene oxide in which $LiBF_4$, $LiCl_4$, $(C_4H_9)_4NBF_4$ or the like is dissolved.

EXAMPLE 1

Test electrodes each having a component containing Pb carried on a surface thereof were prepared. By use of each test electrode thus obtained, an oxidation reaction of a sugar was demonstrated. Further, batteries each incorporating such a test electrode as the negative electrode were fabricated.

(i) Preparation of Test Electrode

Test Electrode A

A 50 $\mu$m-thick Pb-Sn alloy foil containing 61.9 wt % of tin was used as the conductive substrate. This alloy foil was cut to a size of 1×0.5 cm and joined with a nickel lead. The junction and the nickel lead were coated with an epoxy resin, to obtain a test piece.

Figure 2:
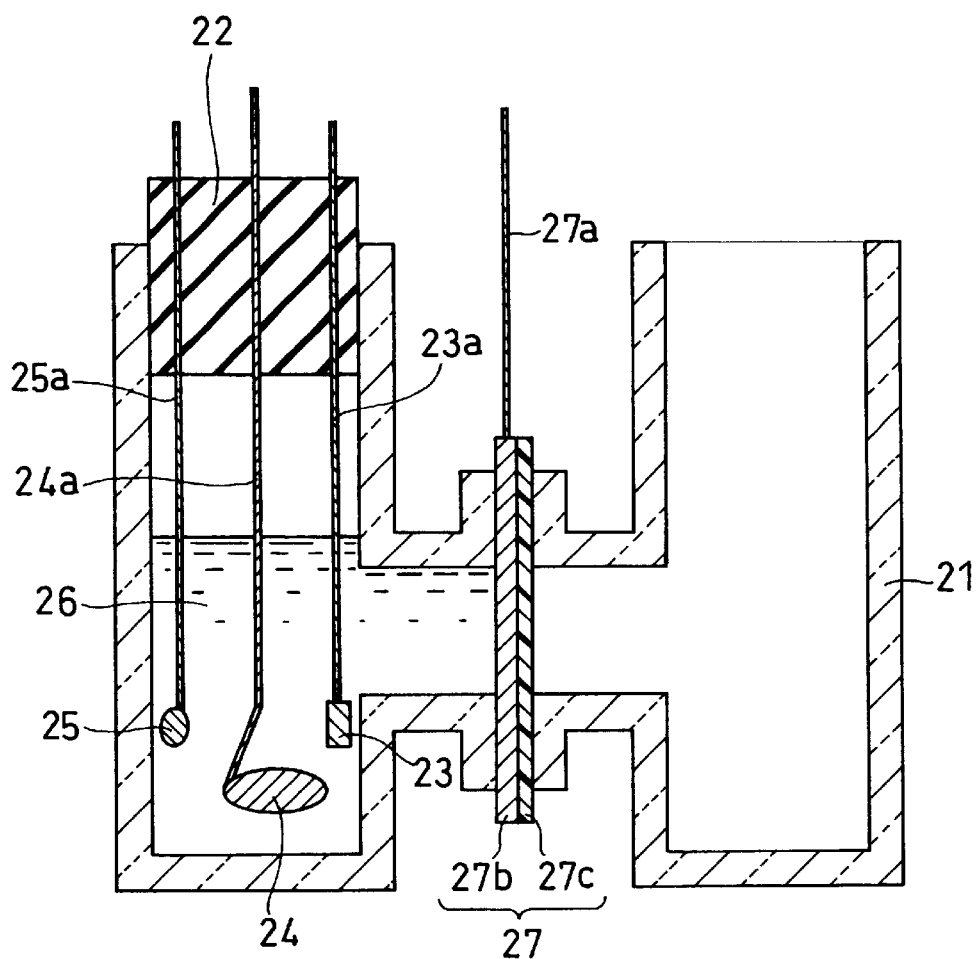
FIG. 2 is a sectional view showing a cell used in the manufacture of a test electrode, oxidation reaction of a sugar thereon, and evaluation of a battery provided therewith in one example of the present invention.

Using the test piece having a metallic luster thus obtained as a working electrode, i.e. negative electrode 23, a cell as shown in FIG. 2 was assembled which comprised a glass vessel 21, a rubber plug 22, the working electrode 23, a platinum electrode 24, an Hg/HgO standard electrode 25, an electrolyte 26 and an oxygen electrode 27. For the electrolyte 26 was used an aqueous solution containing 3.1 wt % of KOH. The lead 23a of the working electrode 23, the lead 24a of the platinum electrode 24 and the lead 25a of the standard electrode 25 were fixed to the glass vessel 21 by means of the rubber plug 22.

The oxygen electrode 27 comprised a layer 27b comprising an activated carbon and a manganese oxide in a low oxidation state, and a layer 27c comprising a water repellent resin such as polytetrafluoroethylene.

The working electrode 23 was subjected to electrolysis with the platinum electrode 24 used as the counter electrode, to give a test electrode A. In the electrolysis, the potential of the working electrode 23 was swept from minus 1.2 V to 0 V and then 0 V to minus 1.2 V relative to the standard electrode 25. This cycle was repeated five times. The potential sweep rate was set to 20 mV/sec.

A white substance was deposited on the surface of the test electrode A. This white substance was identified as a mixture of compounds containing basic lead carbonate and a stannate by X-ray photoelectron spectroscopy, i.e. XPS.

Test Electrode B

A test electrode B was prepared in the same manner as in the preparation of the test electrode A except that the potential sweep range in the electrolysis for the test piece was from minus 1.2 V to plus 0.8 V. A dark brown substance was deposited on the surface of the test electrode B. The dark brown substance was identified as a mixture of compounds containing PbO and a stannate by XPS.

Test Electrode C

A test electrode C was prepared in the same manner as in the preparation of the test electrode A except use of a 100 $\mu$m-thick Pb-Sb alloy foil containing 13 wt % of antimony. A white substance was deposited on the surface of the test electrode C. This white substance was identified as a mixture of compounds containing basic lead carbonate and antimony oxide by XPS.

Test Electrode D

A test electrode D was prepared in the same manner as in the preparation of the test electrode B except use of a 100 $\mu$m-thick Pb-Sb alloy foil containing 13 wt % of antimony. A dark brown substance was deposited on the surface of the test electrode D. This dark brown substance was identified as a mixture of compounds containing PbO and antimony oxide by XPS.

Test Electrode E

A test electrode E was prepared in the same manner as in the preparation of the test electrode A except use of a 500 $\mu$m-thick lead foil having a purity of 99.9% and an aqueous solution containing 6.2 wt % of KOH as the electrolyte. A white substance was deposited on the surface of the test electrode E. This white substance was identified as a mixture of compounds containing basic lead carbonate by XPS.

Test Electrode F

A test electrode F was prepared in the same manner as in the preparation of the test electrode B except use of a 500 $\mu$m-thick lead foil having a purity of 99.9% and an aqueous solution containing 6.2 wt % of KOH as the electrolyte. A dark brown substance was deposited on the surface of the test electrode F. This dark brown substance was identified as a mixture of compounds containing PbO by XPS.

Test Electrode G

In an apparatus used for chemical vapor deposition, there were disposed diisopropoxylead (Pb(i-OC$_3$H$_7$)$_2$) in a molybdenum boat, tetraethoxytin (Sn(OC$_2$H$_5$)$_4$) in another molybdenum boat, and tetraethoxytitanium (Ti(OC$_2$H$_5$)$_4$) in yet another molybdenum boat as sources to be evaporated. A conductive substrate having a thickness of 0.5 mm formed by pressing graphite fiber was disposed in a reactor located downstream of the sources. This conductive substrate was sized 1×0.5 cm and joined with a Ni lead. The substrate was heated to 400° C. and the sources were also heated, while argon gas was introduced to flow from the upstream side of the sources toward the downstream side. Products of the pyrolysis of diisopropoxylead, tetraethoxytin and tetraethoxytitanium were allowed to deposit on the surface of the conductive substrate for 5 minutes. After having cooled the sources, argon gas containing 1 vol % of oxygen was introduced to flow from the upstream side of the sources toward the downstream side for 60 minutes, to obtain a test electrode G having lead oxide, tin oxide and titanium oxide carried on the surface of the conductive substrate.

Test Electrode H

A 100 $\mu$m-thick Ni foil sized 1×0.5 cm, which was joined with a Ni lead, was placed in a reactor charged with argon gas to displace air, and heated to 600° C. by an infrared lamp. A solution of 0.05 mol/liter of diisopropoxylead and 0.05 mol/liter of tetraethoxytitanium in ethanol was sprayed to the heated Ni foil for 10 minutes. Thereafter, argon gas containing 1 vol % of oxygen was supplied to the reactor, and the foil was allowed to stand for 60 minutes, to obtained a test electrode H having lead oxide and titanium oxide carried on the surface of the Ni foil.

(ii) Oxidation Reaction of Sugar

Current-potential Characteristic of Test Electrode

The cell shown in FIG. 2 was assembled. Used as the electrolyte 26 was an aqueous solution containing 0.62 wt % of KOH only, or an aqueous solution containing 0.62 wt % of KOH and 0.02 mol/liter of glucose dissolved therein. The test electrode B was used as the working electrode 23, and the platinum electrode 24 was used as the counter electrode.

Electrolysis was performed at room temperature with the electrolyte 26 left still standing by repeating 20 times a cycle such as to sweep the potential of the working electrode 23 from minus 1.2 V to plus 0.8 V and then plus 0.8 V to minus 1.2 V. The relation between current and potential exhibited at the 20th cycle by the working electrode are shown in FIG. 3, in which $X^1$ represents the relation in the case using the electrolyte containing glucose dissolved therein, while $Y^1$ represents the relation in the case using the electrolyte containing no glucose.

Figure 3:
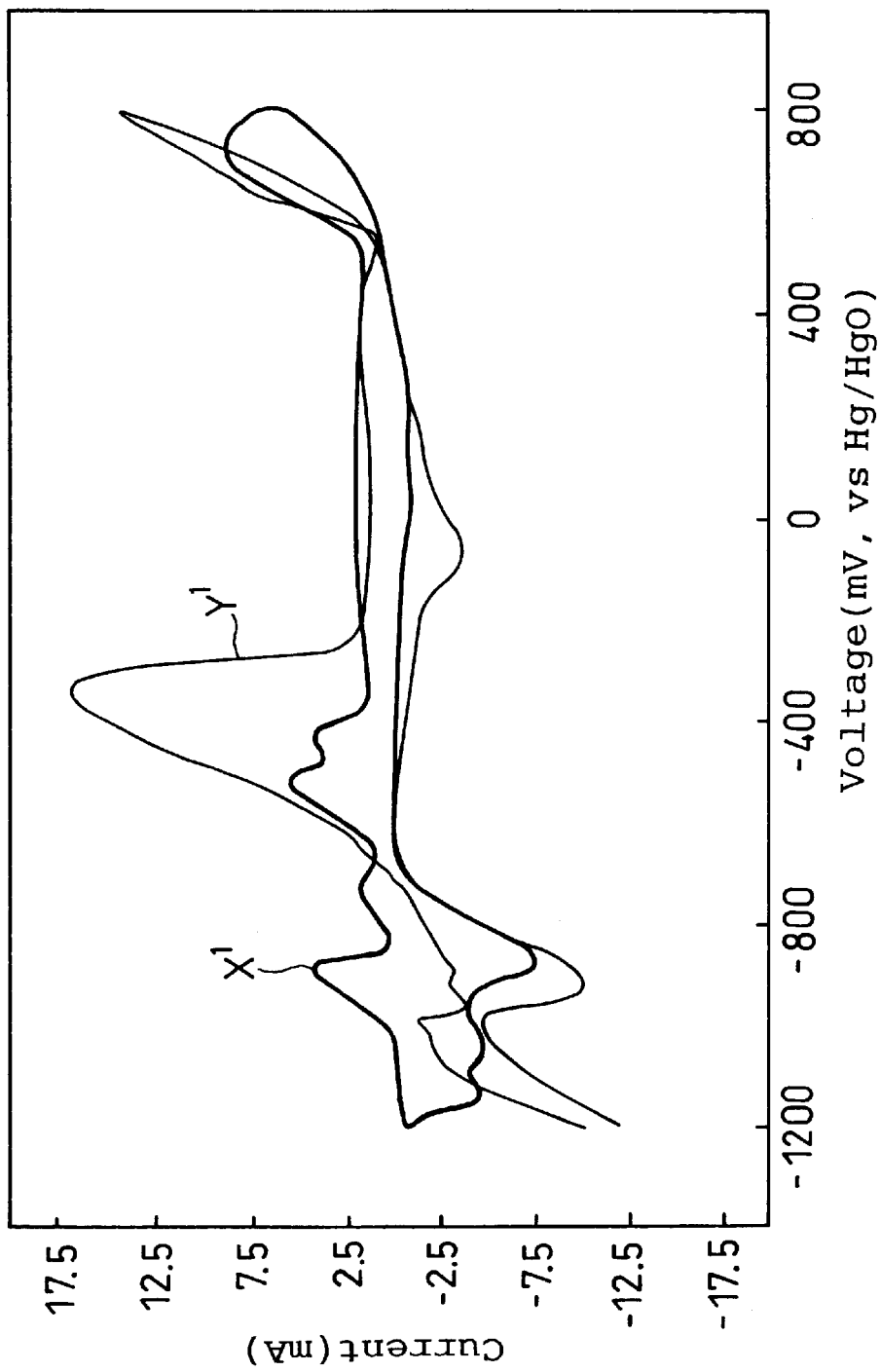
FIG. 3 is a graph showing relations between current and potential exhibited by a test electrode in one example of the present invention.

As shown in FIG. 3, an oxidation current associated with dissolution of lead alloy at about minus 0.4 V in the electrolyte containing glucose was relatively small compared with that in the electrolyte containing no glucose. This means that the dissolution of lead alloy was suppressed in the electrolyte containing glucose. Further, peaks were observed in the oxidation current resulting from oxidation of glucose at about minus 1.0 V, minus 0.8 V and minus 0.6 V.

When the electrolyte containing glucose was analyzed by liquid chromatography after the electrolysis, there were detected gluconic acid, oxalic acid and formic acid, which were products of oxidation of glucose.

The test electrodes A and C to H were evaluated in the same manner as above. The results of the evaluation indicated the occurrence of oxidation of glucose as in the case of the test electrode B. Further, a similar evaluation was conducted using, instead of glucose, each of galactose, mannose, sorbose and fructose classified as monosaccharides, maltose, sucrose, lactose and raffinose classified as disaccharides, and starch classified as a polysaccharide. The results of the evaluation indicated the occurrence of oxidation of a sugar as in the case of glucose. Thus, electrochemical oxidation of a sugar caused by the test electrodes in accordance with this example was confirmed.

Figure 4:
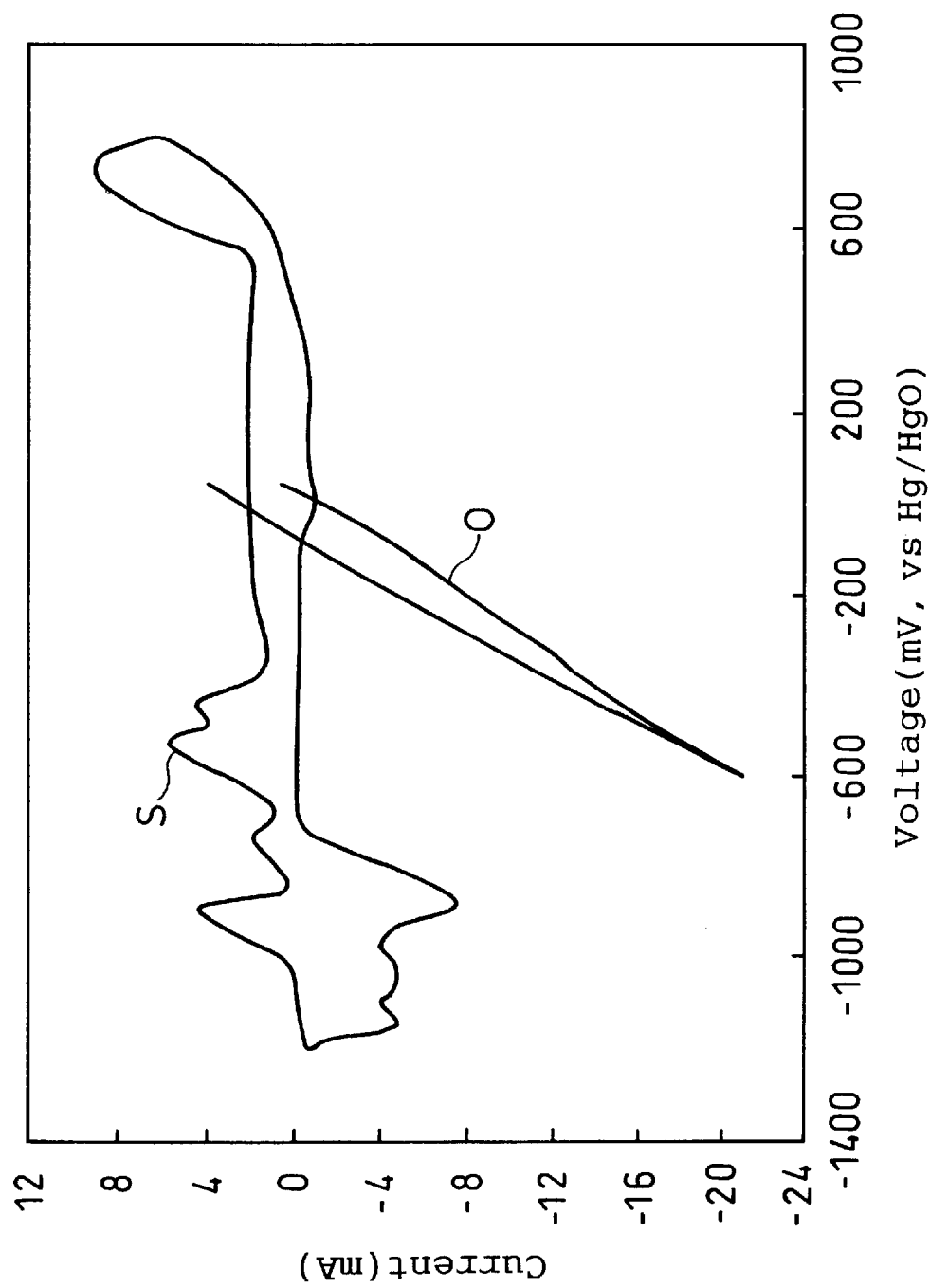
FIG. 4 is a graph showing relations between current and potential exhibited by a test electrode and an oxygen electrode in one example of the present invention.

FIG. 4 shows the relation between current and potential (S) exhibited by the test electrode B. and the relation between current and potential (O) exhibited by the oxygen electrode 27 in the case where the aqueous solution containing 0.62 wt % of KOH and 0.02 mol/liter of glucose dissolved therein was used as the electrolyte. In the case of the oxygen electrode, a reduction current resulting from reduction of oxygen appeared in a potential zone extending from about plus 0.1 V toward the minus side. In the case of the test electrode B, on the other hand, an oxidation current resulting from oxidation of glucose appeared in a potential zone from about minus 1 V to minus 0.4 V. This indicates that a battery capable of generating an electromotive force of 1 to 0.4 V can be provided by combining the oxygen electrode to be used as the positive electrode and the test electrode B to be used as the negative electrode.

Time-potential Characteristic of Test Electrode

The cell shown in FIG. 2 was assembled. Used as the electrolyte 26 was an aqueous solution containing 0.31 wt % of KOH only, or an aqueous solution containing 0.31 wt % of KOH and 0.5 mol/liter of glucose dissolved therein. The test electrode A was used as the working electrode 23, and the platinum electrode 24 was used as the counter electrode.

While the electrolyte 26 was stirred at a room temperature, a constant current of 2 mA was passed across the working electrode 23 and the platinum electrode 24 in the oxidizing direction for 1200 seconds. The relations between time and potential resulting from this test are shown in FIG. 5, in which $X^2$ represents the relation in the case using the electrolyte containing glucose dissolved therein, and $Y^2$ represents the relation in the case using the electrolyte containing no glucose. In the electrolyte containing glucose, the potential of the working electrode 23 was constant at minus 580 mV even 1200 seconds after the start of the electrolysis. As can be understood therefrom, glucose was oxidized continuously. In the electrolyte containing no glucose, on the other hand, the potential of the working electrode 23 shifted from about minus 610 mV, which was indicative of the occurrence of dissolution of lead alloy due to oxidation, to about plus 400 mV, at which an oxide in a high oxidation state was produced from the lead alloy, at the time when 300 seconds elapsed from the start of the electrolysis.

The test electrodes B to H were evaluated in the same manner as above. The results of the evaluation indicated the occurrence of continuous oxidation of a sugar in the electrolyte containing glucose as in the case of the test electrode A. Table 1 shows the potential of each test electrode in each electrolyte obtained 1200 seconds after the start of the electrolysis.

TABLE 1

| Electrode | Conductive substrate | Component containing Pb | Potential after 1200 sec. (mV vs Hg/HgO) | |
|---|---|---|---|---|
| | | | With Glucose | Without glucose |
| A | Pb—Sn | Basic lead carbonate + Stannate | −580 | +400 |
| B | Pb—Sn | PbO + Stannate | −550 | +460 |
| C | Pb—Sb | Basic lead carbonate + Antimony oxide | −560 | +420 |

TABLE 1-continued

| Electrode | Conductive substrate | Component containing Pb | Potential after 1200 sec. (mV vs Hg/HgO) | |
|---|---|---|---|---|
| | | | With Glucose | Without glucose |
| D | Pb—Sb | PbO + Antimony oxide | −510 | +440 |
| E | Pb | Basic lead carbonate | −370 | +480 |
| F | Pb | PbO | −380 | +480 |
| G | C | Lead oxide + Tin oxide + Titanium oxide | −560 | +390 |
| H | Ni | Lead oxide + Titanium oxide | −540 | +410 |

A similar evaluation was conducted using each of galactose, mannose, sorbose and fructose classified as monosaccharides, maltose, sucrose, lactose and raffinose classified as disaccharides, and starch classified as a polysaccharide. The results of the evaluation indicated the occurrence of continuous oxidation of a sugar as in the case of glucose.

As seen from Table 1, each of the test electrodes A to D, G and H having a component containing Pb mixed with Sn or Sb on the surface of the conductive substrate exhibited a lower potential than the test electrodes E and F each having the conductive substrate of lead. It can be understood therefrom that oxidation of a sugar was facilitated by Sn, Sb, or Ti. Besides Sn, Sb and Ti used in this example, In and Mg are effective as such components for facilitating electrolytic oxidation of a sugar.

(iii) Evaluation of Battery

The cell shown in FIG. 2 was assembled. Used as the electrolyte 26 was an aqueous solution containing 0.62 wt % of KOH only, or an aqueous solution containing 0.62 wt % of KOH and 0.5 mol/liter of glucose dissolved therein. The test electrode A was used as the working electrode 23, and an oxygen electrode 27 comprising activated carbon and a manganese oxide in a low oxidation state and having a diameter of 3 cm was used as the positive electrode.

Figure 6:
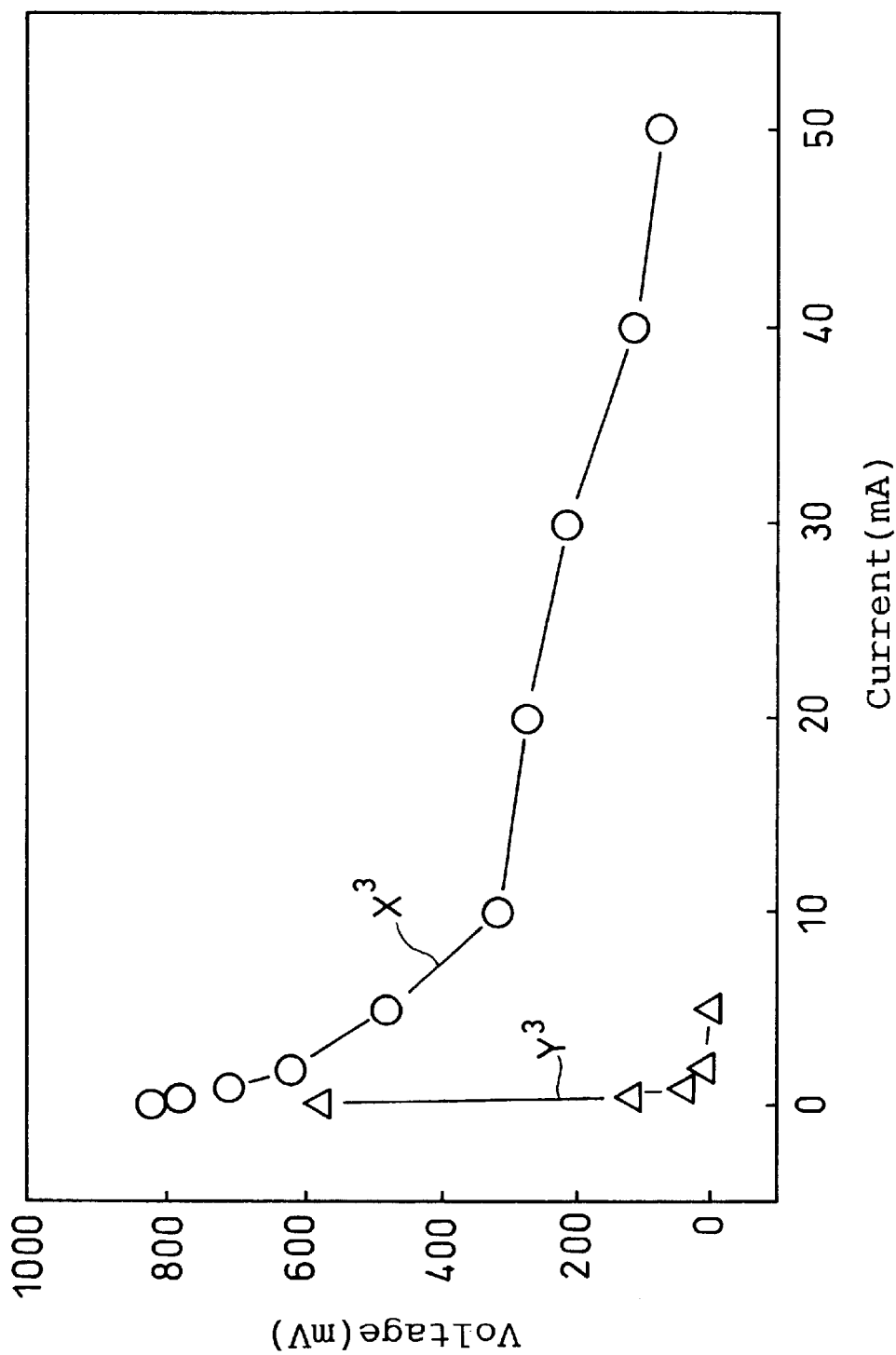
FIG. 6 is a graph showing relations between current and voltage exhibited by a battery in one example of the present invention.

While the electrolyte 26 was stirred at a room temperature, the cell was discharged at a constant current of 0.2 to 50 mA for 20 seconds. The relations between current and voltage obtained from this test is shown in FIG. 6 in which $X^3$ represents the relation in the case using the electrolyte containing glucose, and $Y^3$ represents the relation in the case using the electrolyte containing no glucose.

With respect to each of the test electrodes A to H while the electrolyte 26 was stirred at a room temperature, the corresponding cell was discharged at a constant current of 1 mA for one hour. The voltage obtained one hour after the start of the discharging in each case is shown in Table 2.

TABLE 2

| | Voltage (V) obtained one hour after the start of the discharging | |
|---|---|---|
| Electrode | With glucose | Without glucose |
| A | 0.60 | 0 |
| B | 0.57 | 0 |
| C | 0.58 | 0 |
| D | 0.53 | 0 |
| E | 0.39 | 0 |

TABLE 2-continued

| | Voltage (V) obtained one hour after the start of the discharging | |
|---|---|---|
| Electrode | With glucose | Without glucose |
| F | 0.35 | 0 |
| G | 0.54 | 0 |
| H | 0.52 | 0 |

The relations between current and voltage shown in FIG. 6 and the results shown in Table 2 indicate that electric energy could be directly taken out of a sugar by the use of the batteries in accordance with this example.

A similar evaluation was conducted using, instead of glucose, each of galactose, mannose, sorbose and fructose classified as monosaccharides, maltose, sucrose, lactose and raffinose classified as disaccharides, and starch classified as a polysaccharide. It was confirmed from the results that batteries capable of operating like those using glucose could be obtained.

EXAMPLE 2

Test electrodes each having a component containing Ag or Cu carried on a surface thereof were prepared. By use of each test electrode thus obtained, an oxidation reaction of a sugar was demonstrated. Further, batteries each incorporating such a test electrode as the negative electrode were fabricated.

(i) Preparation of Test Electrode

Test Electrode I

A 50 $\mu$m-thick silver foil having a purity of 99.9% was cut to a size of 1×0.5 cm and joined with a nickel lead. The junction and the nickel lead were coated with an epoxy resin, to obtain a test piece. Using the test piece thus obtained as the working electrode, electrolysis was performed in the cell as shown in FIG. 2 in the same manner as the test electrode A, to give a test electrode I. The electrolysis was performed with the potential of the working electrode relative to that of the Hg/HgO standard electrode ranging from minus 1.2 V to plus 0.8 V.

Test Electrode J

A test electrode J was prepared in the same manner as in the preparation of the test electrode I except use of a 100 $\mu$m-thick Ag—Cu alloy foil comprising 75 wt % of silver and 25 wt % of copper.

Test Electrode K

A test electrode K was prepared in the same manner as in the preparation of the test electrode I except use of a 100 $\mu$m-thick Ag—Mg alloy foil comprising 55 wt % of silver and 45 wt % of magnesium.

Test Electrode L

A test electrode L was prepared in the same manner as in the preparation of the test electrode I except use of a 30 $\mu$m-thick copper foil having a purity of 99.9%.

Test Electrode M

A test electrode M was prepared in the same manner as in the preparation of the test electrode I except use of a 100 $\mu$m-thick Cu—Zn alloy foil comprising 65 wt % of copper and 35 wt % of zinc.

Test Electrode N

A test electrode N was prepared in the same manner as in the preparation of the test electrode I except use of a 100 $\mu$m-thick Cu—Ni alloy foil comprising 80 wt % of copper and 20 wt % of nickel.

(ii) Oxidation Reaction of Sugar

The cell shown in FIG. 2 was assembled. Used as the electrolyte 26 was an aqueous solution containing 0.62 wt % of KOH only, or an aqueous solution containing 0.62 wt % of KOH and 0.2 mol/liter of fructose dissolved therein. Electrolysis was performed using each of the test electrodes I to N as the working electrode 23 and the platinum electrode 24 as the counter electrode. In the electrolysis, a constant current of 2 mA was passed across the working electrode 23 and the platinum electrode 24 for 1200 seconds to evaluate the relation between time and potential. The potential of each test electrode in each electrolyte obtained 1200 seconds after the start of the electrolysis is shown in Table 3.

TABLE 3

| | | Potential after 1200 sec. (mV vs Hg/HgO) | |
|---|---|---|---|
| Electrode | Conductive substrate | With fructose | Without fructose |
| I | Ag | −250 | +420 |
| J | Ag—Cu | −310 | +360 |
| K | Ag—Mg | −360 | +280 |
| L | Cu | −320 | +680 |
| M | Cu—Zn | −380 | +580 |
| N | Cu—Ni | −320 | +720 |

As seen from Table 3, the potential of any one of the test electrodes used as the working electrode 23 was within the range from minus 380 mV to minus 250 mV even 1200 seconds after the start of the electrolysis in the case where the electrolyte containing fructose was used. As can be understood therefrom, fructose was continuously oxidized. In the case where the electrolyte containing no fructose was used, on the other hand, the test electrodes I to K each containing silver or silver alloy exhibited a potential proximate to plus 400 mV, which was indicative of the occurrence of oxidation of silver. The potential of each of the test electrodes L to N containing copper or copper alloy shifted from about minus 400 mV, which was indicative of the occurrence of dissolution of copper due to oxidation, to about plus 700 mV, which was indicative of generation of oxygen due to electrolysis of water, at the time when about 1200 seconds elapsed from the start of the electrolysis.

A similar evaluation was conducted using, instead of fructose, each of glucose, galactose, mannose and sorbose classified as monosaccharides, maltose, sucrose, lactose and raffinose classified as disaccharides, and starch classified as a polysaccharide. The results of the evaluation indicated the occurrence of continuous oxidation of a sugar. It was therefore confirmed that the use of each test electrode in accordance with this example enabled continuous oxidation of a sugar.

(iii) Evaluation of Battery

The cell shown in FIG. 2 was assembled. Used as the electrolyte 26 was an aqueous solution containing 3.1 wt % of KOH only, or an aqueous solution containing 3.1 wt % of KOH and 0.5 mol/liter of fructose dissolved therein. Each of the test electrodes I to N was used as the working electrode 23, and an oxygen electrode 27 identical with that used in example 1 was used as the positive electrode.

While the electrolyte 26 was stirred at a room temperature, the cell was discharged at a constant current of 1 mA for one hour. The voltage of the cell at the time one hour after the start of the discharging was shown in Table 4.

TABLE 4

| Electrode | Voltage (V) obtained one hour after the start of the discharging | |
|---|---|---|
| | With fructose | Without fructose |
| I | 0.24 | 0 |
| J | 0.30 | 0 |
| K | 0.33 | 0 |
| L | 0.31 | 0 |
| M | 0.36 | 0 |
| N | 0.30 | 0 |

The results shown in Table 4 indicate that the batteries in accordance with this example made it possible to take electric energy out of a sugar directly.

A similar evaluation was conducted using, instead of fructose, each of glucose, galactose, mannose and sorbose classified as monosaccharides, maltose, sucrose, lactose and raffinose classified as disaccharides, and starch classified as a polysaccharide. As a result, batteries capable of operating like those using fructose could be obtained.

EXAMPLE 3

In this example, test electrodes having a component containing Pb, Ag or Cu, and additionally, thiocyanuric acid (s-triazine-2,4,6-trithiol, hereinafter referred to as "TCA") or 2,2'-dithiobisethanamine (hereinafter referred to as "CYSTN") carried on the surface thereof. Using each of the electrodes thus prepared, an oxidation reaction of a sugar was performed. Further, batteries each incorporating such a test electrode as the negative electrode were fabricated.

(i) Preparation of Electrode

A solution (A) of 0.05 mol/liter of TCA in ethanol and a solution (B) of 0.01 mol/liter of CYST in ethanol were prepared. The test electrode A of example 1 and the test electrodes J and N of example 2 were dipped into the solution (A) or (B) and then dried to give test electrodes O, P, Q, R, S and T each having TCA molecules or CYST molecules on the surface thereof as shown in Table 5.

(ii) Oxidation Reaction of Sugar

The cell shown in FIG. 2 was assembled. Used as the electrolyte 26 was an aqueous alkaline solution containing 0.31 wt % of KOH only or an aqueous solution containing 0.31 wt% of KOH and 0.5 mol/liter of glucose dissolved therein. Each of the test electrodes O to T was used as the working electrode 23, and the platinum electrode 24 was used as the counter electrode.

While the electrolyte 26 was stirred at a room temperature, a constant current of 2 mA was passed across the working electrode 23 and the platinum electrode 24 in the oxidizing direction for 1200 seconds to evaluate the relation between the time and potential. The potential of each test electrode in each electrolyte at the time 1200 seconds after the start of the electrolysis is shown in Table 5.

TABLE 5

| Electrode | Conductive substrate | Additional component | Potential after 1200 sec. (mV vs Hg/HgO) | |
|---|---|---|---|---|
| | | | With glucose | Without glucose |
| O | Pb—Sn | TCA | −610 | +380 |
| P | Pb—Sn | CYST | −620 | +410 |
| Q | Ag—Cu | TCA | −380 | +330 |
| R | Ag—Cu | CYST | −430 | +320 |
| S | Cu—Ni | TCA | −440 | +680 |
| T | Cu—Ni | CYST | −460 | +650 |

As seen from Table 5, the potential of any one of the test electrodes used as the working electrode 23 was within the range from minus 620 mV to minus 380 mV even 1200 seconds after the start of the electrolysis in the case where the electrolyte containing glucose was used. As can be understood therefrom, glucose was continuously oxidized. In the case where the electrolyte containing no glucose was used, on the other hand, the potential of each of the test electrodes O and P containing a lead alloy shifted to about plus 400 mV, which is indicative of the occurrence of production of a high oxide of lead in a high oxidation state, 600 seconds after the start of the electrolysis. The potential of each of the test electrodes Q and R containing a silver alloy was constant at about plus 300 mV, which is indicative of the occurrence of oxidation of silver. Further, the potential of each of the test electrodes S and T containing a copper alloy shifted from about minus 400 mV, which is indicative of the occurrence of dissolution of copper due to oxidation, to about plus 650 to 700 mV, which is indicative of the occurrence of generation of oxygen due to electrolysis of water, about 580 seconds after the start of the electrolysis.

A similar evaluation was conducted using, instead of glucose, each of galactose, mannose, sorbose and fructose classified as monosaccharides, maltose, sucrose, lactose and raffinose classified as disaccharides, and starch classified as a polysaccharide. The results of the evaluation indicated the occurrence of continuous oxidation of a sugar. It was therefore confirmed that the use of each test electrode in accordance with this example enabled continuous oxidation of a sugar.

(iii) Evaluation of Battery

The cell shown in FIG. 2 was assembled. Used as the electrolyte 26 was an aqueous solution containing 3.1 wt % of KOH only, or an aqueous solution containing 3.1 wt % of KOH and 0.5 mol/liter of fructose dissolved therein. Each of the test electrodes O to T was used as the working electrode 23, and an oxygen electrode 27 identical with that used in example 1 was used as the positive electrode.

While the electrolyte 26 was stirred at a room temperature, the cell was discharged at a constant current of 1 mA for one hour. The voltage of the cell an hour after the start of the discharging was shown in Table 6.

TABLE 6

| Electrode | Voltage (V) obtained one hour after the start of the discharging | |
|---|---|---|
| | With fructose | Without fructose |
| O | 0.62 | 0 |
| P | 0.63 | 0 |
| Q | 0.36 | 0 |
| R | 0.40 | 0 |
| S | 0.42 | 0 |
| T | 0.44 | 0 |

The results shown in Table 6 indicate that the batteries in accordance with this example made it possible to take electric energy directly out of a sugar.

A similar evaluation was conducted using, instead of fructose, each of glucose, galactose, mannose and sorbose classified as monosaccharides, maltose, sucrose, lactose and raffinose classified as disaccharides, and starch classified as a polysaccharide. As a result, batteries capable of operating like those using fructose were obtained.

EXAMPLE 4

The cell shown in FIG. 2 was assembled. Used as the positive electrode was a positive electrode containing $MnO_2$ as used in a manganese dry battery, a positive electrode containing NiOOH as used in a nickel-metal hydride storage battery, a positive electrode containing $PbO_2$ as used in a lead storage battery, or a positive electrode containing $LiCoO_2$ as used in a lithium ion battery. Each of the test electrodes A, G and H in accordance with example 1 was used as the negative electrode. Used as the electrolyte was an aqueous solution containing $ZnCl_2$, KOH or $H_2SO_4$, and 0.1 mol/liter of mannose, raffinose or starch dissolved therein, or a non-aqueous solution, i.e. PC-EC-Gly-LiPF$_6$ containing 0.1 mol/liter of mannose, raffinose or starch dissolved therein.

The aqueous solution of $ZnCl_2$ contained 30 wt % of $ZnCl_2$ and saturated with ZnO. The aqueous solution of KOH contained 6.2 wt % of KOH. The aqueous solution of $H_2SO_4$ contained 18 wt % of of $H_2SO_4$. PC-EC-Gly-LiPF$_6$ was prepared by dissolving 1.2 mol/liter of LiPF$_6$ in a mixture comprising propylene carbonate (PC), ethylene carbonate (EC) and glycerin (Gly) at a volume ratio of 1:1:0.5.

Each cell was discharged at a constant current of 1 mA. The voltage of each cell obtained one hour after the start of the discharging was shown in Table 7, 8 or 9.

TABLE 7

| Working Electrode | Positive electrode | Electrolyte | Voltage (V) obtained one hour after the start of the discharging | |
|---|---|---|---|---|
| | | | With mannose | Without mannose |
| A | $MnO_2$ | Aqueous $ZnCl_2$ | 0.9 | 0.2 |
| | $MnO_2$ | Aqueous KOH | 0.8 | 0.3 |
| | NiOOH | Aqueous KOH | 0.7 | 0.4 |
| | $PbO_2$ | Aqueous $H_2SO_4$ | 1.0 | 0.2 |
| | $LiCoO_2$ | PC-EC-Gly-LiPF$_6$ | 2.8 | 0.6 |

TABLE 8

| Working Electrode | Positive electrode | Electrolyte | Voltage (V) obtained one hour after the start of the discharging | |
|---|---|---|---|---|
| | | | With raffinose | Without raffinose |
| G | $MnO_2$ | Aqueous $ZnCl_2$ | 0.8 | 0 |
| | $MnO_2$ | Aqueous KOH | 0.7 | 0 |
| | NiOOH | Aqueous KOH | 0.7 | 0 |
| | $PbO_2$ | Aqueous $H_2SO_4$ | 1.2 | 0.1 |
| | $LiCoO_2$ | PC-EC-Gly-LiPF$_6$ | 2.6 | 0 |

TABLE 9

| Working Electrode | Positive electrode | Electrolyte | Voltage (V) obtained one hour after the start of the discharging | |
|---|---|---|---|---|
| | | | With starch | Without starch |
| H | $MnO_2$ | Aqueous $ZnCl_2$ | 0.6 | 0 |
| | $MnO_2$ | Aqueous KOH | 0.4 | 0 |
| | NiOOH | Aqueous KOH | 0.5 | 0 |
| | $PbO_2$ | Aqueous $H_2SO_4$ | 1.0 | 0 |
| | $LiCoO_2$ | PC-EC-Gly-LiPF$_6$ | 2.2 | 0 |

The results shown in Tables 7 to 9 indicate that the batteries in accordance with the present invention can take electric energy directly out of a sugar.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for generating an electric power by generating an electromotive force between a positive electrode and a negative electrode with an electrolyte intervening therebetween, comprising a process of electrolytic oxidation of a sugar on said negative electrode with cleavage of at least one carbon-carbon bond of said sugar said electrolytic oxidation comprising a step of forming a coordination compound comprising said sugar.

2. A method for generating an electric power by generating an electromotive force between a positive electrode and a negative electrode with an electrolyte intervening therebetween, comprising a process of electrolytic oxidative of a sugar on said negative electrode with cleavage of at least one carbon-carbon bond of said sugar said negative electrode comprising a component capable of forming a coordination compound with said sugar via a hydroxyl group thereof.

3. The method for generating an electric power in accordance with claim 2, wherein said component is carried on a conductive substrate which constitutes said negative electrode.

4. The method for generating an electric power in accordance with claim 2, wherein said component comprises a metal element capable of forming an amphoteric hydroxide.

5. The method for generating an electric power in accordance with claim 4, wherein said metal element is at least one selected from the group consisting of Mg, Ti, V, Ni, Cu, Zn, Zr, Ag, In, Sn, Sb, and Pb.

6. A battery comprising a positive electrode, a negative electrode, an electrolyte intervening between said positive electrode and said negative electrode, said sugar to be supplied to said negative electrode, said negative electrode being capable of promoting an electrolytic oxidation of said sugar thereon to generate an electromotive force between said positive electrode and said negative electrode, said oxidation being associated with cleavage of at least one carbon-carbon bond of said sugar said negative electrode comprising a component capable of forming a coordination compound with a sugar via a hydroxyl group thereof.

7. The battery in accordance with claim 6, wherein said component is carried on a conductive substrate which constitutes said negative electrode.

* * * * *